Feb. 21, 1956  C. A. HUBERT ET AL  2,735,281
SHROUDED POWER TAKE-OFF SHAFT FOR TRACTORS
Filed Sept. 9, 1952  3 Sheets-Sheet 1

Inventors.
Clarence A. Hubert
John R. Orelind
Paul O. Pippel
Atty.

Feb. 21, 1956 C. A. HUBERT ET AL 2,735,281
SHROUDED POWER TAKE-OFF SHAFT FOR TRACTORS
Filed Sept. 9, 1952 3 Sheets-Sheet 2

Inventors.
Clarence A. Hubert
John R. Orelind
Paul O. Pippel
Atty.

Feb. 21, 1956 C. A. HUBERT ET AL 2,735,281
SHROUDED POWER TAKE-OFF SHAFT FOR TRACTORS
Filed Sept. 9, 1952 3 Sheets-Sheet 3

Inventors.
Clarence A. Hubert
John R. Orelind

United States Patent Office 2,735,281
Patented Feb. 21, 1956

2,735,281

SHROUDED POWER TAKE-OFF SHAFT FOR TRACTORS

Clarence A. Hubert, Chicago, and John R. Orelind, Wilmette, Ill., assignors to International Harvester Company, a corporation of New Jersey Application September 9, 1952, Serial No. 308,672

2 Claims. (Cl. 64—1)

This invention has to do with power take-off assemblies for agricultural tractors or the like and more particularly concerns a power take-off shaft installation wherein the outer end portion of the shaft is substantially shrouded by a side wall opening into which it extends from the interior of the tractor body.

It is common practice for farm tractors to be equipped with a power take-off shaft which can be connected with the tractor engine at the will of an operator for deriving power from such engine. This power is sometimes used for operating power-driven apparatus upon vehicles towed behind the tractor. Because of this common use for power take-off shafts they usually project rearwardly from the back end of the tractor body to facilitate attachment thereto of rearwardly extending power transmitting connections.

The rearwardly extending stub of the power take-off shaft has been recognized as a source of danger because of its likelihood of catching upon the clothing of persons near the tractor, and, to diminish this danger, sheet metal guards have been provided for attachment to the rear side of the tractor body about such stub. Another disadvantage of the rearwardly projecting power-take-off shaft stub and also of the guard shield therefor is that these parts occupy space that preferably should be occupied or traversed by earth-working tools or the like mounted upon the rear of the tractor. When tools are mounted upon the rear side of a tractor it is essential that these tools be liftable from their operating position to a transport position and it is possible to mount these tools closer to the tractor body if they or operating linkages therefor can pass through or occupy the space which would be occupied by a power take-off shaft stub and rearwardly projecting shield for such stub. This would be while the power take-off was not in use.

An important object of this invention is the provision of an improved power take-off assembly which avoids the above explained disadvantage by providing a power take-off shaft with extension connecting means on a rear end portion thereof contained with an outer end portion of a bearing opening for the shaft in the rear wall of the tractor body.

A further object of the invention is the provision for a tractor power take-off shaft of a casing bearing opening having an inner end portion containing a bearing for said shaft, an outer end portion adapted to shroud an outer connecting end portion of the shaft, and an intermediate portion containing a seal coacting with such opening and with the shaft for preventing migration through such opening of lubricant from the interior of the tractor body or influx of foreign abrasive particles.

Still a further object is the provision of a power-take-off shaft having a radially flanged outer end portion encased within an enlarged outer end portion of an opening therefor in a casing side wall, together with means within the flange for removably attaching an axially extending extension on said shaft.

An additional object is the provision of a power-take-off shaft having an outer end portion accessible by virtue of the outer end of a bearing opening therefor in the side wall of the casing for selective attachment or detachment of a shaft extension making the power-take-off shaft utilisable, but wherein the rear end portion of the power-take-off shaft is adequately shrouded by the bearing opening and has no parts projecting outwardly of such opening that would constitute a hazard from the standpoint of catching onto clothing or otherwise causing injury to parts of a person or things accidentally reaching contact therewith.

The above and other desirable objects inherent in and encompassed by the invention are elucidated in the ensuing description, the appended claims and the annexed drawings, wherein:

Figure 1:
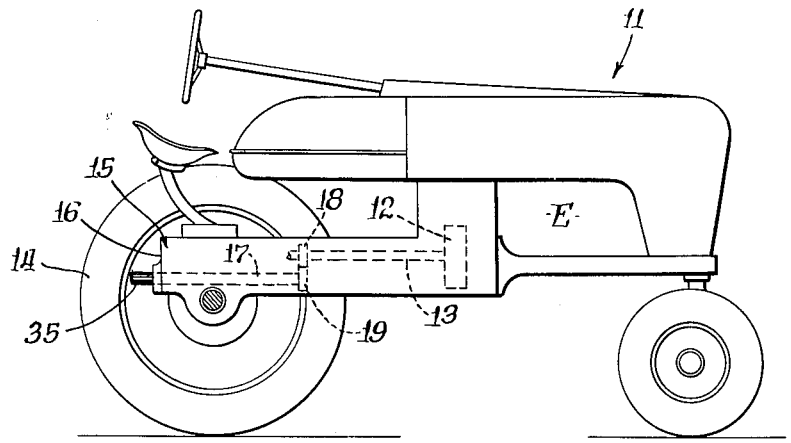
Figure 1 is a small scale side elevation of a tractor having a power take-off assembly constructed according to the present invention.

Referring now to Figure 1, there is shown a typical tractor 11 having an engine E which, through a conventional clutch 12, drives a shaft 13 which, through conventional transmission change speed gearing rearwardly thereof (not shown) and differential gearing (not shown) drives the traction wheels 14 of which the one on the nearest side of the tractor has been removed for better illustrating a rear portion of the tractor body 15 having a rear wall 16.

A power-take-off shaft 17 is driven from the shaft 13 by means of a gear 18 constrained for rotation with such shaft and a gear 19 meshed with the gear 18 and non-rotatively mounted upon a forward portion of said power-take-off shaft.

Figure 2:
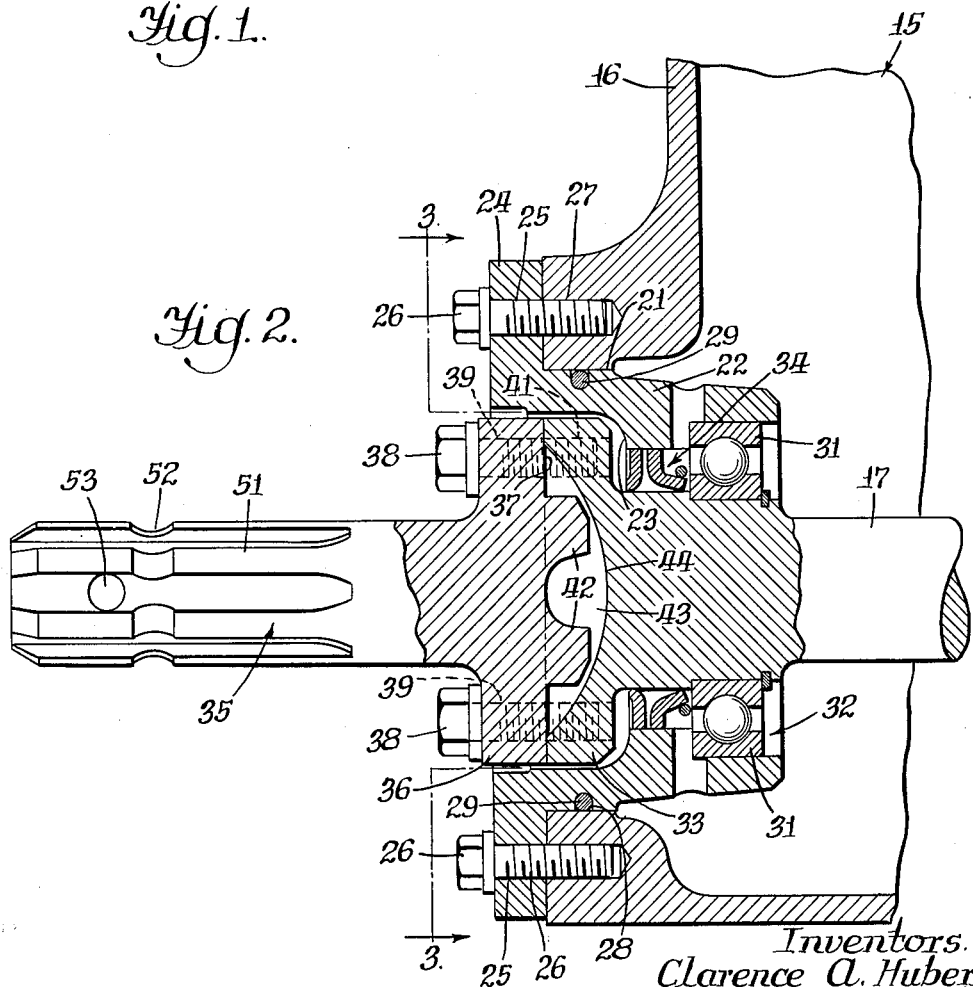
Figure 2 is an enlarged vertical sectional view taken through the rear side wall of the tractor body, the view being taken at a plane coinciding with the axis of a rearwardly extending power-take-off shaft and an extension therefor which are shown partly in side elevation and partly in section.

Referring now to Figure 2, a lower part of the tractor body rear wall 16 contains a hole 21 into which there is inserted an annular element 22 which provides a bearing opening 23 for a rear end portion of the power-take-off shaft 17. The annular element 22 has a rear end flange 24 containing a circle of four openings 25 spaced apart 90° about the principal axis of such element for receiving shanks of cap screws 26 which are turned into threaded recesses 27 for mounting said element upon the rear wall 16. The annular element 22 is piloted within the circular hole 21 and contains an annular groove 28 in which there is an O-ring 29 for improving the seal between the outer periphery of the element 22 and that portion of the wall 16 bounding the hole 21.

The outer race 31 of an anti-friction bearing unit 32 is mounted in the annular element 22 at a section within the inner end portion of the bearing opening 23, whereas a radially projecting flange 33 on the rear end portion of the power take-off shaft 17 is shrouded by that part of the annular element 22 bounding a radially enlarged outer end portion of the bearing opening 23. A seal device 34 coacts between a section of the power take-off shaft 17 and an inner peripheral portion of the annular element 22 bounding an intermediate part of the bearing opening 23.

A power take-off extension shaft 35 is arranged coaxially with the shaft 17 and has a radial flange 36 in opposed contiguity with a rear end face 37 of the power take-off shaft flange 33. Means for releasably maintaining the contiguous relation of the end portions of the shafts 17 and 35 and constraining them for unitary rotation includes cap screws 38 passing through holes 39 in the flange 36 and turned into threaded holes 41 in the power take-off shaft flange 33. These threaded holes 41 constitute a form of connecting means elements on the flange 33 that are accessible through the outer end of the casing wall bearing opening 23.

The cap screws 38 are supplemented in their action of constraining the shafts 17 and 35 for unitary rotation by dental driving components in the form of axial tooth-like projections 42 on the inner end of the extension shaft 35 and opposite parallel sides 43 of a diametric driving socket 44 formed in the outer end of the shaft 17. These dental components 42 and 43 are meshed pursuant to endwise assembly of the extension shaft 35 with the power take-off shaft 17. The sides 43 of the socket 44 are also regarded as torsional force transmitting facet means which extend axially and transversely of the shaft 17, the torsional force being transmitted to the extension shaft 35 by contact of these facets with complemental facets 46 on the sides of the dental projections 42 of the extension shaft.

The stub shaft or extension 35 for the power-take-off shaft 17 projects a distance rearwardly from the rear wall 16 of the tractor body that is standard in the industry for connection with various types of power-driven equipment. Also, the splines 51, notches 52 and a diametric hole 53 in the shaft extension 35 are of standard size and arrangement for establishing a driving connection with various power driven equipment. Excepting when power is to be transmitted from the power-take-off shaft 17 the extension 35 will be removed after unfastening the cap screws 38, thereby leaving only the outer end face 37 of the shaft 17 exposed. Inasmuch as this end portion of the shaft is shrouded within the outer end portion of the bearing opening 23 and has no fastening means elements projecting therefrom outwardly beyond the outer end of the bearing opening 23, it would be virtually impossible for any part of the body or clothing of a person coming in contact with the rotating shaft to be caught thereon or injured thereby.

Figure 3:
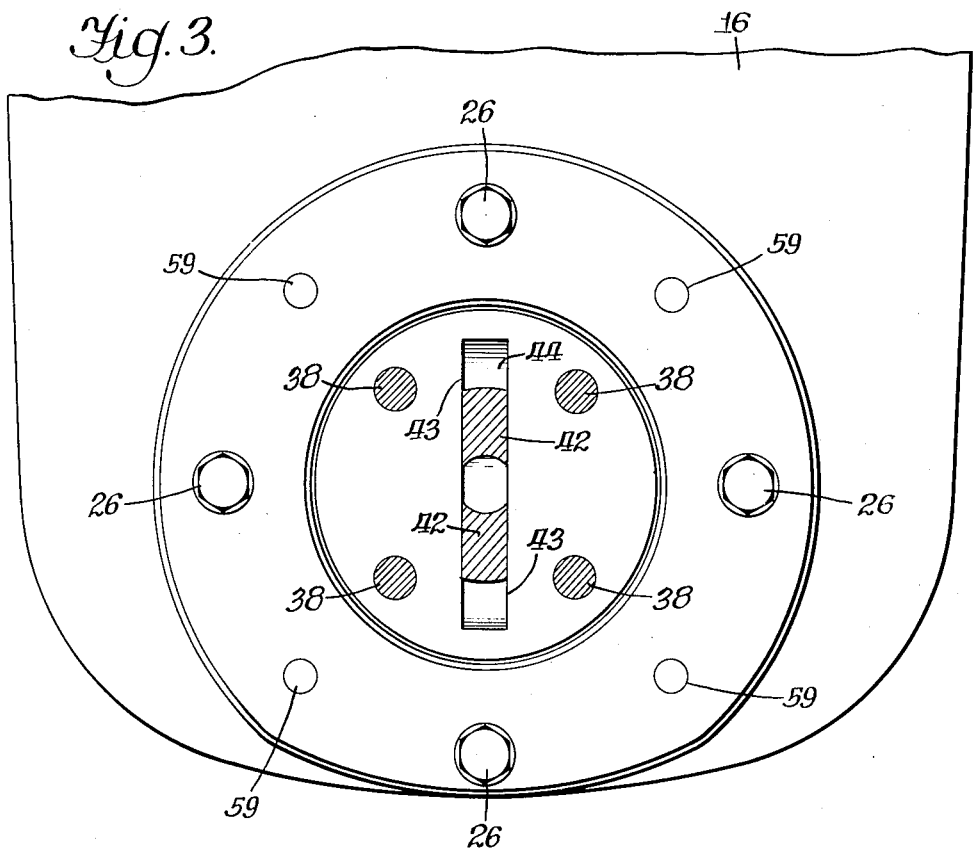
Figure 3 is a rear elevational view of the lower portion of the tractor rear side wall and of the rear end of the power-take-off shaft from which the extension has been removed, the view being taken substantially at the plane indicated by the line 3—3 in Figure 2.
Figure 4:
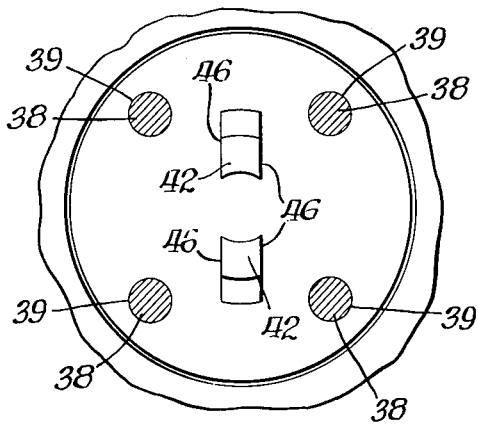
Figure 4 is a front end elevational view of the power-take-off shaft extension.
Figure 5:
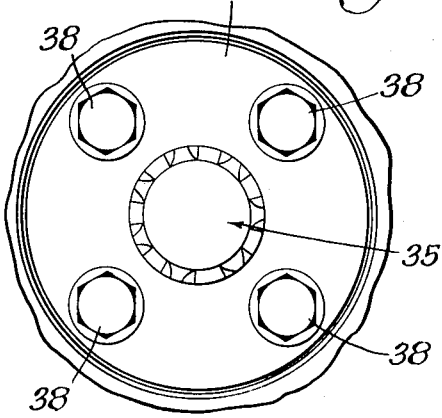
Figure 5 is a rear end elevational view of the power-take-off shaft extension.
Figure 6:
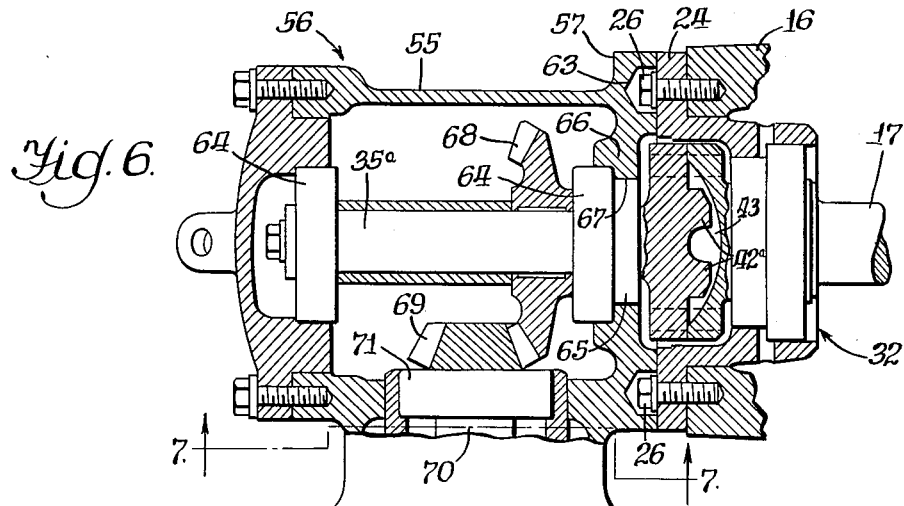
Figure 6 is an enlarged fragmentary view looking downwardly and showing in horizontal section a belt pulley attachment and driving means therefor having its casing attached to the rear wall of the tractor, the attachment including a modified form of extension drivingly connected with the power-take-off shaft.
Figure 7:
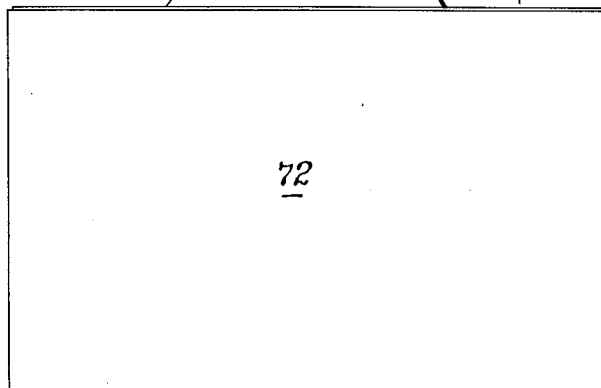
Figure 7 is a vertical sectional view taken on the line 7—X of Figure 6.
Figure 7:
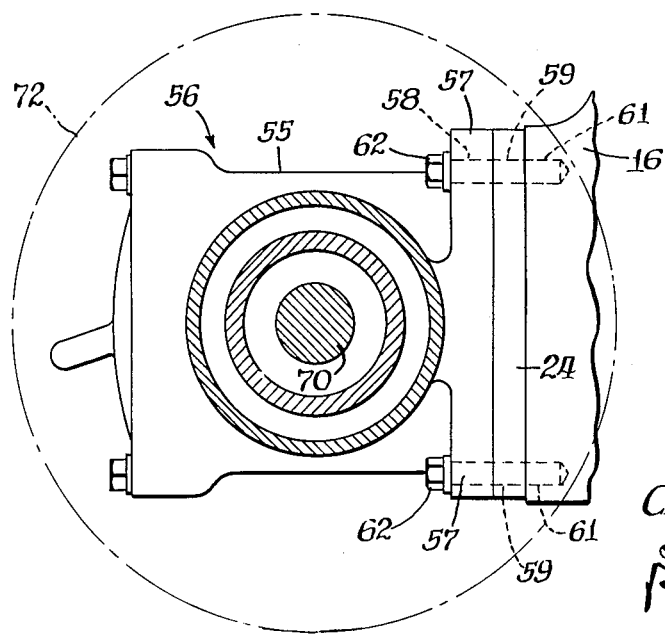

Figure 6 illustrates a belt pulley power-take-off attachment driveable from the power-take-off shaft 17 and containing an extension shaft 35a therefor disposed in coaxial driving relation with respect thereto in place of the shaft 35 in Figure 2. A housing 55 of the belt pulley power-take-off unit 56 comprises a flange 57 containing holes 58 respectively registering with holes 59, Figures 3 and 7, in flange 24 of the annular member 22 and threaded recesses 61 in the rear side wall of the tractor body 16. Cap screws 62 are inserted through the holes 58 and 59 into the threaded recesses 61 for attaching the housing 55 to the tractor with the shafts 35a and 17 associated, as illustrated in Figure 6. Recesses 63 in the flange 57 register with and receive the heads of the cap screws 26. The projections 42a on the shaft 35a correspond to the projections 42 on the shaft 35 and project into the diametric socket in the rear end of the shaft 17 for cooperating therewith in the transmission of torsional force between the two shafts.

Shaft 35a is supported in the casing housing 55 by anti-friction bearing units 64, there being a seal 65 between the shaft 35a and an end wall 66 about a circular opening 67 through which the shaft 35a projects from the casing 55. A gear 68 constrained for rotation with the shaft 35a meshes with a gear 69 on a pulley drive shaft 70 which is supported upon roller bearing units 71 in the housing 55. A belt-driving pulley 72 is constrained for rotation with the outer end of the pulley-driving shaft 70.

The bearing units 64 prevent endwise movement of the shaft 35a relatively to the housing 55, and the flange 57 of said housing, forming a rim about the opening 67 through which the shaft 35a projects, is in abutting relation with the tractor side wall 16 through the flange 24 assembled with such side wall, and the cap screws 62 serve to secure the housing 55 with its rim in such abutting relation to maintain the meshed relation of the shaft driving components 42a and 43.

Having thus described the invention in conjunction with a limited number of representative embodiments thereof with the view of clearly and concisely illustrating the same, we claim:

1. In a power take-off assembly for tractors and the like having a casing body with a side wall, means providing an opening communicating through said side wall, said opening having an intermediate portion between inner and outer end portions respectively thereof, an anti-friction bearing unit mounted in the inner end portion of said opening, a power take-off shaft having an outer end portion with a radially extending flange and a diametric driving socket in the end of such end portion radially inward from said flange, said shaft being journalled in the bearing unit and extending into the casing while said flange is closely shrouded within the outer end portion of said opening, sealing means disposed between the intermediate portion of the opening and a section of the shaft between the flange and the bearing unit, and means for releasably attaching the flange of a radially flanged extension shaft in coaxial relation with said power take-off shaft comprising threaded holes extending axially in the power take-off shaft flange and exposed through the outer end portion of said opening.

2. In a power take-off assembly for tractors and the like having a casing body with a side wall, means providing an opening communicating through said side wall, said opening having an intermediate portion between inner and outer end portions respectively thereof, an anti-friction bearing unit mounted in the inner end portion of said opening, a power take-off shaft having an outer end portion with a radially extending flange and a driving socket in the end of such end portion radially inward from said flange, said shaft being journalled in the bearing unit and extending into the casing while said flange is closely shrouded within the outer end portion of said opening, sealing means disposed between the intermediate portion of the opening and a section of the shaft between the flange and the bearing unit, a coaxial extension shaft for said power take-off shaft and having a radial flange in opposed contiguity with the power take-off shaft flange and an axial tooth-like projection disposed radially inwardly from said flanges and within the driving socket in driven relation therewith, the outer end portion of the side wall opening being of a diameter to accommodate endwise movement of said flanges inwardly and outwardly thereof, and means releasably assembled with said flanges for maintaining the contiguous relation thereof and manipulative through the outer end portion of the side wall opening for selectively interconnecting or disconnecting said flanges.

References Cited in the file of this patent

UNITED STATES PATENTS

| | | |
|---|---|---|
| 759,726 | Maxim | May 10, 1904 |
| 1,119,392 | Bernett | Dec. 1, 1914 |
| 1,629,949 | Caffarello | May 24, 1927 |
| 1,900,305 | Schoenrock | Mar. 7, 1933 |
| 2,104,669 | Peterson | Jan. 4, 1938 |

FOREIGN PATENTS

| | | |
|---|---|---|
| 169,455 | Great Britain | Dec. 21, 1922 |